United States Patent [19]
Molloy

[11] Patent Number: 6,105,147
[45] Date of Patent: Aug. 15, 2000

[54] USING PROCESS PAIRS AS TRANSACTION-COORDINATED RESOURCE MANAGERS

[75] Inventor: Mark E. Molloy, San Jose, Calif.

[73] Assignee: Compaq Computer Corporation, Cupertino, Calif.

[21] Appl. No.: 08/840,749

[22] Filed: Apr. 16, 1997

[51] Int. Cl.[7] .................................................. G06F 11/00
[52] U.S. Cl. ............................................. 714/16; 714/19
[58] Field of Search ............................. 395/182.13, 133, 395/508, 551; 714/12, 15, 16, 19, 20; 713/200, 201, 202; 709/217, 218, 219, 231

[56] References Cited

U.S. PATENT DOCUMENTS

| | | | |
|---|---|---|---|
| 5,280,612 | 1/1994 | Lorie et al. | 395/600 |
| 5,287,496 | 2/1994 | Chen et al. | 395/600 |
| 5,613,060 | 3/1997 | Britton et al. | 395/182.13 |
| 5,720,018 | 2/1998 | Muller et al. | 395/133 |
| 5,815,689 | 9/1998 | Shaw et al. | 395/551 |
| 5,828,384 | 10/1998 | Iwasaki et al. | 345/508 |
| 5,897,657 | 4/1999 | Hagersten et al. | 711/145 |
| 5,905,876 | 5/1999 | Pawlowski et al. | 710/112 |

*Primary Examiner*—Joseph E. Palys
*Assistant Examiner*—Abu Hossain
*Attorney, Agent, or Firm*—Fenwick & West LLP

[57] ABSTRACT

The present invention is a process-pair resource manager for use in a transaction processing system. The process-pair resource manager includes a concurrent aspect and a serial aspect. The concurrent aspect provides an object-like interface to a protected resource. An application program participating in a transaction accesses the protected resource by passing messages to the concurrent aspect. The concurrent aspect adds a description of each message as well as the result of processing each message to a transaction record. At the conclusion of a transaction, the concurrent aspect passes the transaction record to the serial aspect. The serial aspect then replays the transaction, using the transaction record. If the replay of the transaction is consistent with the transaction as recorded in the transaction record, the serial aspect sends a message to the concurrent aspect voting to commit the transaction. In turn, the concurrent aspect sends a message to the transaction manager forwarding the commit message.

15 Claims, 9 Drawing Sheets

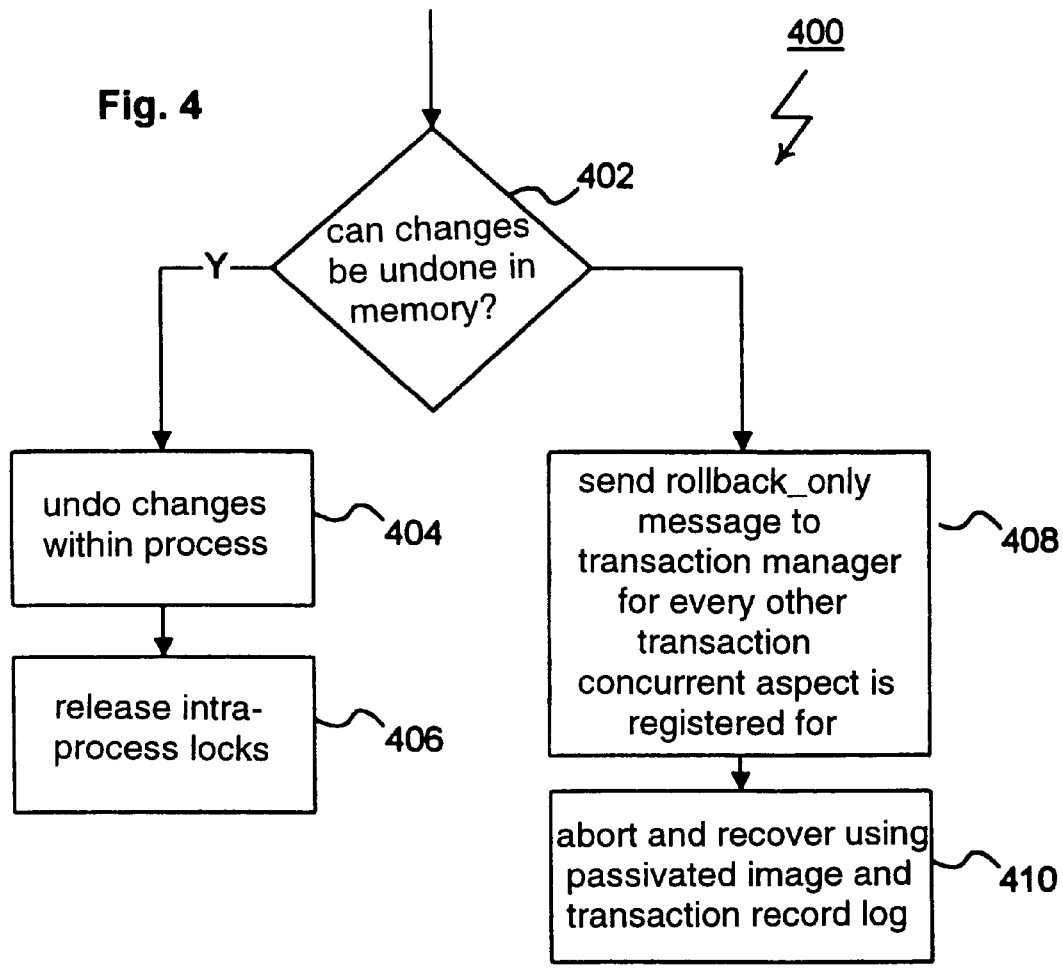

USING PROCESS PAIRS AS TRANSACTION-COORDINATED RESOURCE MANAGERS

FIELD OF THE INVENTION

The present invention relates generally to transaction processing in fault-tolerant computer systems. More specifically, the present invention is a method and apparatus for protecting the state of a resource manager during transaction processing.

BACKGROUND OF THE INVENTION

The concept of a "transaction" is an abstraction used in reliable computer systems to protect certain resources, such as databases. Fundamentally, a transaction is defined as a unit of work that is 1) "atomic," 2) "consistent," 3) "isolated," and 4) "durable" (more commonly, it is said that transactions have "ACID" properties). To initiate a transaction, an application program performs a "begin transaction" operation. Subsequently, the application program accesses and potentially modifies one or more protected resources. At the end of the transaction, the application program executes either a "commit transaction" or a "rollback transaction" operation.

To be "atomic," a transaction must complete in an all-or-none fashion. This means that protected resources must reflect all changes made between a begin transaction operation and a corresponding following commit transaction operation. Protected resources must also reflect none of the changes made between a begin transaction operation and a corresponding following rollback transaction operation. In addition, a transaction that is interrupted by any failure that interferes with its successful completion is rolled back by the transaction system and the application is informed of this result. Again in this case, protected resources must reflect none of the changes made to them by the rolled-back transaction.

To be "consistent," a transaction must move protected resources from one consistent state to another. More specifically, in systems that use the transaction abstraction, the application program and other systems components that participate in a transaction are allowed to specify integrity constraints. Resource managers may also specify their own integrity constraints. For example, in a product inventory database, a typical application-specified integrity constraint would prevent any transaction that would result in a negative quantity of any product. In a genealogy database, an application-specified integrity constraint might be used to prevent any transaction that would result in a child having more than two genetic parents. To be "consistent," each such integrity constraint must be evaluated before the transaction is committed. If any of the integrity constraints are not met, the transaction must be aborted. In this way, transactions are guaranteed to move protected resources from one consistent state to another.

To be "isolated," the changes made to protected resources must be invisible to threads and processes that are not associated with the transaction until the transaction has committed. Typically, isolation is achieved by locking the changed resource. Application programs that attempt to read the locked resource are forced to wait until the transaction has completed.

Finally, to be "durable," the changes made to protected resources must not be lost or corrupted, even in the case of a catastrophic system failure. In this context, durability is not used in the absolute sense. For example, physically destroying the transaction processing computer system and all of its backup records will violate the durability property.

In most systems that use the transaction abstraction, application programs are prevented from directly accessing protected resources. Instead, a resource manager is provided for each protected resource. Application programs access and modify protected resources by sending messages to the corresponding resource manager. In many cases, a single transaction will involve a number of different resources located on a number of different computer systems. In order to preserve ACID properties in distributed transactions of this type, a two-phase commit protocol is used. In the two-phase commit protocol, a transaction manager is used to coordinate the actions of the resource managers involved in a transaction. The transaction manager is also the final arbiter of whether a transaction has committed or not.

To use the two-phase commit protocol an application program sends a begin transaction message to the transaction manager. In response, the transaction manager creates a unique identifier associated with the transaction. Subsequently, the transaction processing system includes the transaction identifier in all messages sent by the application program until the transaction is committed or rolled back.

After performing the begin transaction operation, the application program may send messages to one or more resource managers to access or modify selected resources. Resource managers so contacted may in turn send messages to other resource managers, and so on. Each resource manager contacted in this fashion sends a registration message to the transaction manager. The transaction manager uses the registration message to add the sending resource manager to a list of resource managers participating in the transaction.

To complete the transaction, the application program sends a commit transaction message to the transaction manager. In response, the transaction manager sends a prepare message to each resource manager that has been registered as participating in the transaction. The prepare message asks each resource manager to vote on the outcome of the transaction. In response to the prepare message, each resource manager sends a message back to the transaction manager. The message must either vote "commit," or "rollback." Resource managers voting to rollback the transaction must undo the changes that have been made to their associated resources and abandon the transaction. Resource managers voting to commit, on the other hand, are promising that they can either commit or rollback the transaction, even if a failure occurs after they have voted.

The transaction manager tabulates all of the votes received from the participating resource managers. If each resource manager votes to commit, the transaction manager records the fact that the transaction has committed on durable storage and sends a commit message to each resource manager. The commit message tells the resource managers to commit the changes that have been made to their associated resources. The commit message also tells the resource managers to expose (i.e., make visible) all of the changes that have been made to their associated resources.

Alternatively, if one or more resource managers votes to rollback, the transaction manager sends a rollback resource managers message to each resource manager. The rollback message tells the resource managers to rollback the changes that have been made to their associated resources. The resource managers respond by undoing the changes that have been made to their associated resources and abandoning the transaction.

The ACID properties of a transaction apply to the protected resources that are located on durable media (e.g., magnetic disks). These same ACID properties do not, however, generally apply to the internal state of processes participating in a transaction. As a result, in the event of a rolled back transaction, the internal state of participating processes may have to be manually reconfigured into a pre-transaction condition, or may be lost altogether. Reconfiguration, when possible, may be both complex and time consuming; loss may be completely unacceptable. As a result, a need exists for methods that protect the internal state of processes involved in transactions.

SUMMARY OF THE INVENTION

The present invention includes a resource manger for use in a distributed transaction processing system. More specifically, the resource manager of the present invention is constructed as a process-pair (a process-pair resource manager), having a serial aspect and a concurrent aspect. The serial aspect and the concurrent aspect are actually processes which are instances of the same program—they execute subsets of the same program instructions. After initialization, however, the serial aspect and the concurrent aspect assume different functional roles. The resource manager of the present invention also includes a durable image of the serial aspect in some between-transaction state; it does not have to be up-to-date. The durable image is known as a "passivated image," and may be used to reconstruct the serial aspect in a known state. The resource manager also includes a durable transaction record log, also used for reconstruction of the serial aspect.

During a transaction, the concurrent aspect provides an object-like interface between the application program participating in the transaction and a protected resource. The object-like interface includes one or more publicly available operations, or methods, for accessing or modifying the protected resource. The application program participating in the transaction sends messages to the concurrent aspect to invoke these operations. In response, the concurrent aspect performs the requested operation and, when required, returns a message including the operation's result. The concurrent aspect adds an entry describing each message sent or received to a transaction record, which is uniquely identified with the transaction associated with the message. In this way, the transaction record is updated to include each requested operation and the result that corresponds to each requested operation. Requests and results are kept in sequential order within the transaction record. This record is segregated on a per-transaction basis.

The concurrent aspect also functions as the interface between the process-pair resource manager and the transaction manager. More specifically, when initially contacted by the application program (or by another resource manager on behalf of the application), the concurrent aspect registers itself with the transaction manager as a participating resource manager. As a result, the transaction manager sends a prepare message to the concurrent aspect when the application program requests that the transaction be committed.

In processing the prepare message sent by the transaction manager, the concurrent aspect sends a copy of the corresponding transaction record to the serial aspect. Receipt of the transaction record acts as an implicit prepare message to the serial aspect. In response to the implicit prepare message, the serial aspect performs, in sequence, each of the operations recorded in the transaction record. The result of each operation is then compared by the serial aspect to the corresponding result included in the transaction record. If the operation result differs from the recorded result, the transaction cannot commit. As a result of such a difference being detected, the serial aspect sends a message to the concurrent aspect indicating that the transaction should be rolled back. In turn, the concurrent aspect sends a message the transaction manager voting to rollback the transaction. Alternatively, if each operation result matches the recorded result, and no other errors are detected during this processing, the transaction may prepare and commit. In this case, the serial aspect exposes (i.e., makes visible) all of the changes that have been made to its associated resource. After exposing changes, the serial aspect responds to the implicit prepare message by sending a response message to the concurrent aspect indicating that the transaction should commit.

Concurrently with sending a copy of the transaction record to the serial aspect, the concurrent aspect appends the record to the transaction record log with which the concurrent aspect is associated. Confirmation of the successful completion of this write operation to the durable media where the transaction record log is kept must be received before the concurrent aspect may vote to commit the transaction. It this write operation fails (including by timing out), the concurrent aspect will vote to roll back the transaction, irrespective of whether the serial aspect has approved the commit or not. A third condition exists for the concurrent aspect to be able to vote "commit." This condition requires that all transactions in which the serial aspect has voted to commit since the serial aspect was last recovered to a point reflecting only committed transactions must be committed. This requirement is necessary because the effects of these transactions are "exposed" in the serial aspect. As a result, the state of the serial aspect may depend on the changes made by such other transactions. After receiving the commit vote from the serial aspect and the confirmation of the write to the transaction record log and verifying that all transactions which the serial aspect may be depending on have committed, the concurrent aspect sends a message to the transaction manager voting to commit the transaction.

If each resource manager involved in a transaction votes to commit the transaction, the transaction manager will respond by sending a commit message to the involved resource managers. By registering with the transaction manager, the concurrent aspect becomes a recipient of this commit message. In response to the commit message, the concurrent aspect exposes (i.e., makes visible) all of the changes that have been made to its associated protected resource. The concurrent aspect also records the commit decision, at its convenience, in the transaction record log, and then sends a "forget" message to the transaction manager.

Alternatively, if one or more resource managers involved in a transaction votes to rollback the transaction, the transaction manager will respond by sending a rollback message to the involved resource managers. By registering with the transaction manager, the concurrent aspect becomes a recipient of this rollback message. To respond to the rollback message sent by the transaction manager, the concurrent aspect first notifies the serial aspect that the transaction must be rolled back. The serial aspect then aborts and is restarted using the passivated image and transaction record log. The reconstructed state then reflects all previously committed transactions. The concurrent aspect may then rollback its own changes by undoing the changes in memory. Alternatively, the concurrent aspect may also be aborted and restarted from the passivated image, similarly arriving at a state reflecting all committed transactions.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 4 is a flow chart showing the steps performed by the concurrent aspect to rollback a transaction as used with an embodiment of the present invention.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

Figure 1:
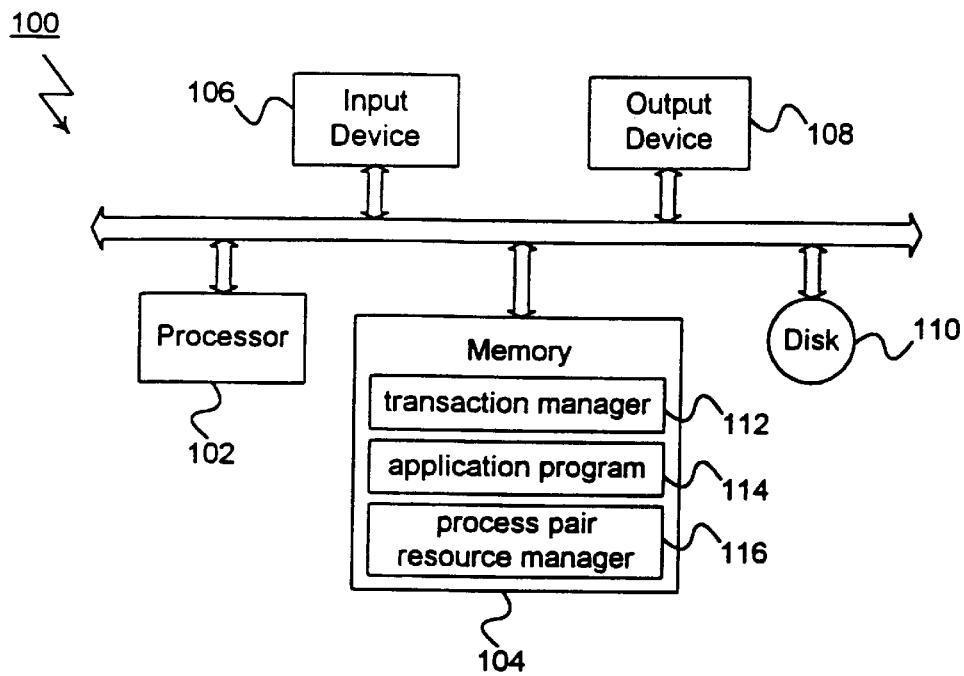
FIG. 1 is a block diagram of a host computer system in accordance with an embodiment of the present invention.

In FIG. 1, a host computer system 100 is shown as a representative environment for the present invention. Structurally, the host computer system 100 includes a processor, or processors 102, and a memory 104. An input device 106 and an output device 108 are connected to processor 102 and memory 104 and represent a wide range of varying I/O devices such as disk drives, keyboards, modems, network adapters, printers and displays. Host computer system 100 also includes a disk drive 110 of any suitable disk drive type. A transaction manager 112, an application program 114 and a resource manager 116 are shown to be resident in memory 104 of host computer 100.

Figure 2:
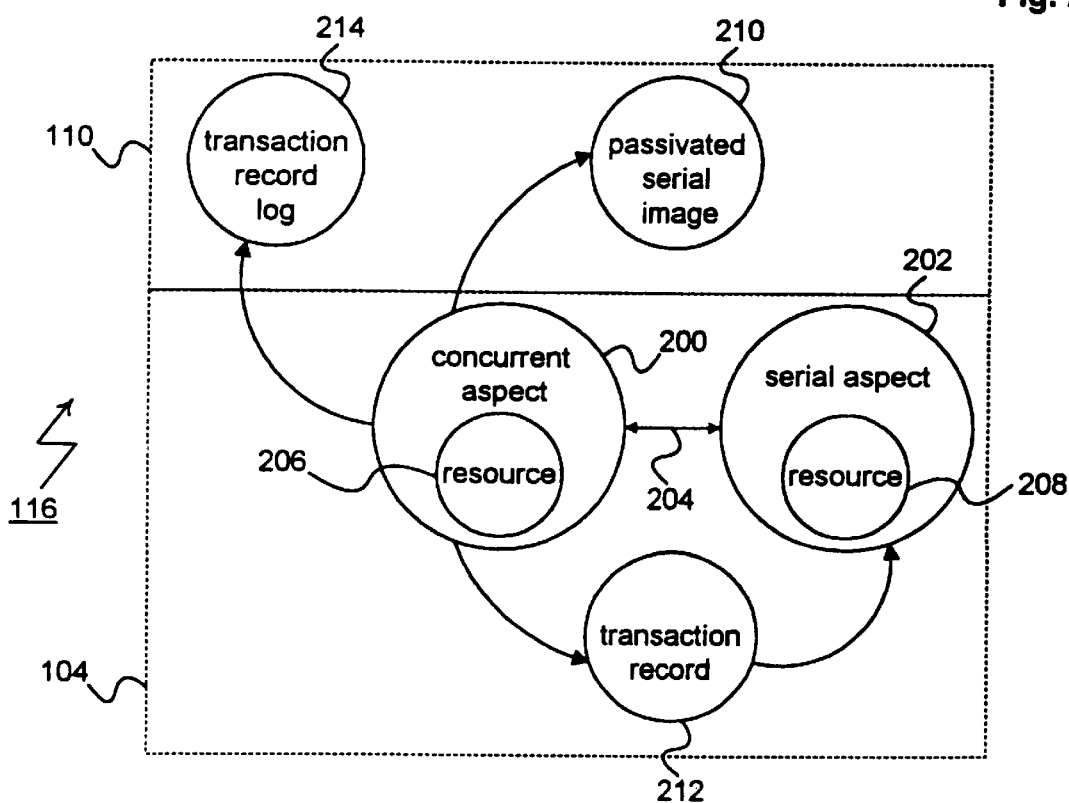
FIG. 2 is a block diagram of a process-pair resource manager in accordance with an embodiment of the present invention.

In FIG. 2, the process-pair resource manager 116 of the present invention is shown to include two separate processes: a concurrent aspect 200 and a serial aspect 202. Preferably, these separate processes are created as separate instances of the same program and execute subsets of the same program instructions. During initialization, the two separate processes assume the role of the concurrent aspect 200 and the serial aspect 202. A communications link 204 connects the concurrent aspect 200 and the serial aspect 202. Typically, communications link 204 is established during initialization of concurrent aspect 200 and the serial aspect 202. Importantly, concurrent aspect 200 and serial aspect 202 may execute in the same, or in different processors; they may also be resident in separate memories 104 during this execution.

The concurrent aspect 200 functions as a object-like interface to a protected resource 206. A copy of the protected resource 206, or protected resource copy 208, is assigned to serial aspect 202. The serial aspect 202 does not, however, provide the same object-like interface. The object-like interface of the concurrent aspect 200 includes one or more methods. Application programs, such as application program 114, access these methods by sending request messages to the concurrent aspect 200. In turn, and when required, the concurrent aspect 200 sends response messages to the application program 114.

The resource manager 116 includes a durable, or "passivated," image 210. The passivated image 210 is an image of the serial aspect 202 in a between-transaction state that is maintained as a durable object, such as a disk file. The passivated image 210 may be reconstructed at various between-transaction times. When needed, the passivated image 210, may be used in combination with transaction record log 214 to reconstruct the serial aspect 202 in the particular between-transaction state which reflects all committed transactions.

The resource manager 116 also includes a transaction record 212 and a transaction record log 214. The transaction record 212 includes each request message received by the concurrent aspect 200 and each response message sent by the concurrent aspect 200 during the course of a single transaction in the order they were received and sent, respectively. There is therefore one transaction record 212 for each transaction in progress with which resource manager 116 is involved. The transaction record log 214 includes, in order, the transaction record 212 of each transaction that has been successfully processed through step 338 (writing the transaction to the transaction record log 214) by the concurrent aspect 200 after the most recent construction of the passivated image 210.

Use of the resource manager 116 as part of a transaction is shown in FIGS. 3A through 3D. More specifically, in step 302 of FIG. 3A application program 114 initiates a transaction by sending a "begin transaction" message to transaction manager 112. In step 304, transaction manager 112 responds to the begin transaction message by generating a transaction id that identifies the new transaction. In step 306, transaction manager 112 returns the transaction id to the application program 114. In step 308, the transaction id is received by the application program 114.

After initiating the transaction, the application program 114 may contact one or more resource managers to access or modify protected resources. For the present invention, the resource managers contacted may include both traditional resource managers as well as the process-pair resource manager 116 shown in FIG. 2. An example of the latter begins with step 310 of FIG. 3B. In step 310, application program 114 sends a message to concurrent aspect 200 of resource manager 116. The message sent in step 310 invokes one of the methods provided by the object-like interface of the concurrent aspect 200. This message is received by concurrent aspect 200 in step 312. In step 314, the concurrent aspect 200 reacts to the message received in step 312 by sending a registration message to the transaction manager 112. The registration message causes the transaction manager 112, in step 316, to register the concurrent aspect 200 as a participant in the transaction initiated in steps 300 through 308 of FIG. 3A.

After registering the current transaction, the transaction manager 112 sends, in step 318, a notification message to the concurrent aspect 200. In step 320, the notification message is received by the concurrent aspect 200. The notification message informs the concurrent aspect 200 that it has been registered as a participant in the current transaction.

In step 322, the concurrent aspect 200 performs the work that the application program 114 has requested. Importantly, the concurrent aspect 200 maintains any changes made to the protected resource 206 in isolation (i.e., these changes are only detectable by the concurrent aspect 200, and only by threads of execution within the concurrent aspect 200 that are associated with the current transaction). Typically, to provide this isolation, the concurrent aspect 200 locks all or part of the protected resource 206 to deny access to other threads within the processes. Normally, the state of the concurrent aspect process 200 is isolated from other processes because processes don't share memory. However, on computer systems which do allow processes to share memory, this locks also protects the modified portion of protected resource 206 from other processes.

In step 324, the concurrent aspect 200 updates the transaction record 212 to include a description of the message sent by the application program 114 in step 310. The concurrent aspect 200 also updates the transaction record 212 to include a description of any response message sent by the concurrent aspect 200 212. The concurrent aspect 200 also includes a description of any external messages sent by the concurrent aspect 200, and any responses to those external messages that the concurrent aspect 200 receives. As an example, it may be assumed that object-like interface provided by the concurrent aspect 200 provides a method for incrementing a counter by a given amount. For this example, the method would return the value of the counter after being incremented. In this case, the concurrent aspect 200 will add a description of the requested increment operation to the transaction record 200 including the amount that the counter is being incremented. The concurrent aspect 200 will also add a description of the result message sent by the concurrent aspect 200 as a result of the increment operation (i.e., the value of the numerical value after being incremented).

Figure 3A:
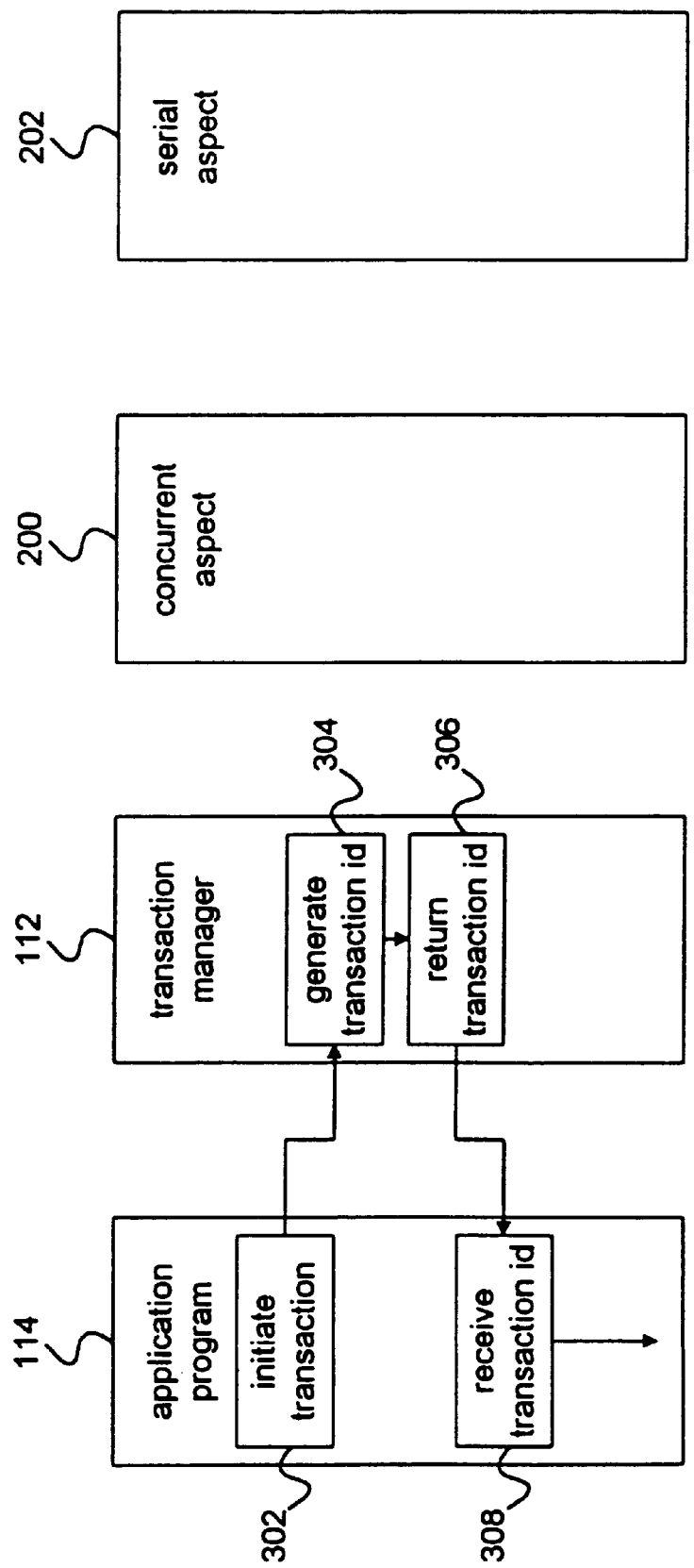
FIG. 3A is a flow chart showing the steps associated with initiation of a transaction as used with an embodiment of the present invention.
Figure 3B:
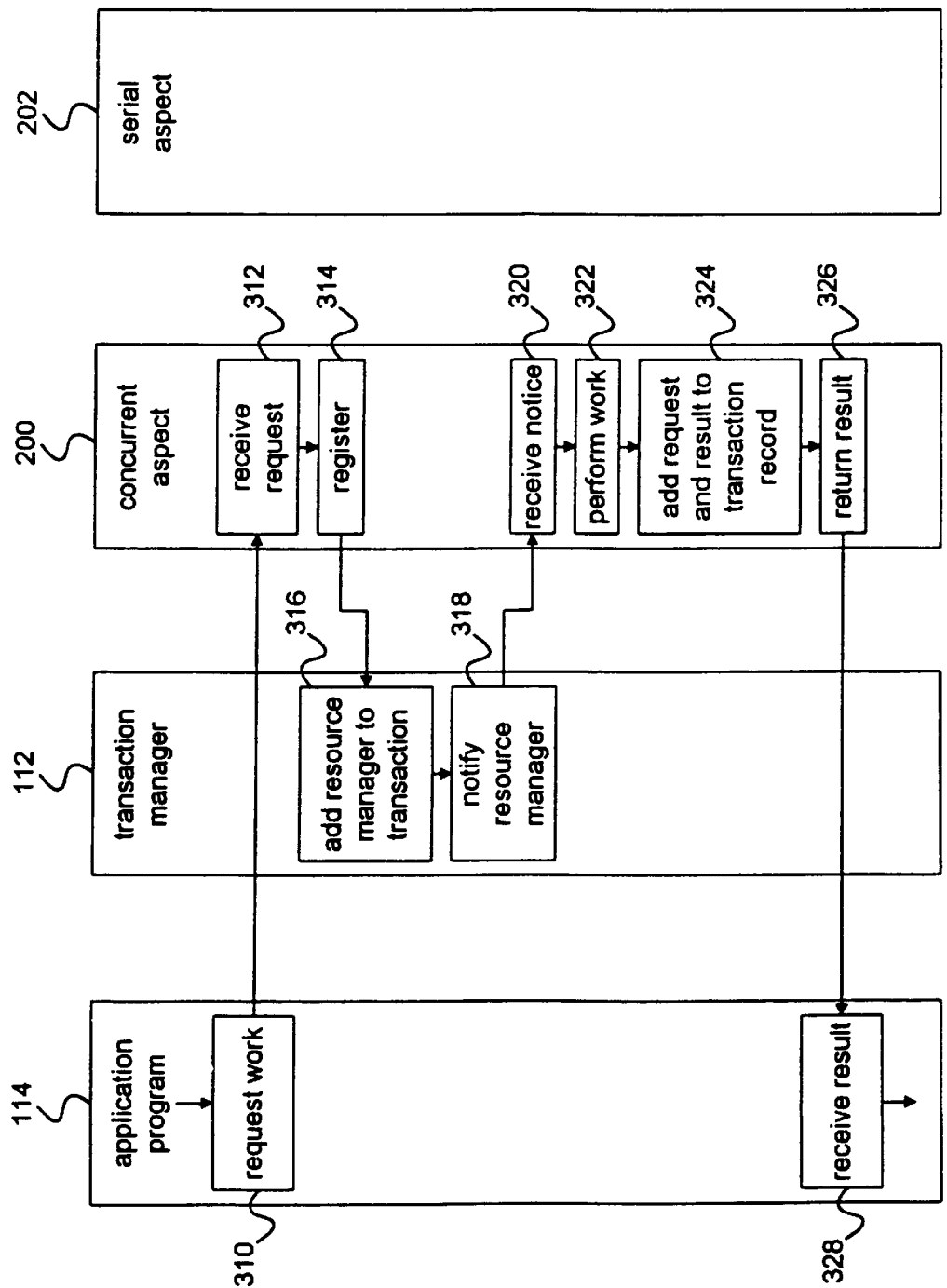
FIG. 3B is a flow chart showing the steps associated with a request for work during a transaction as used with an embodiment of the present invention.
Figure 3C:
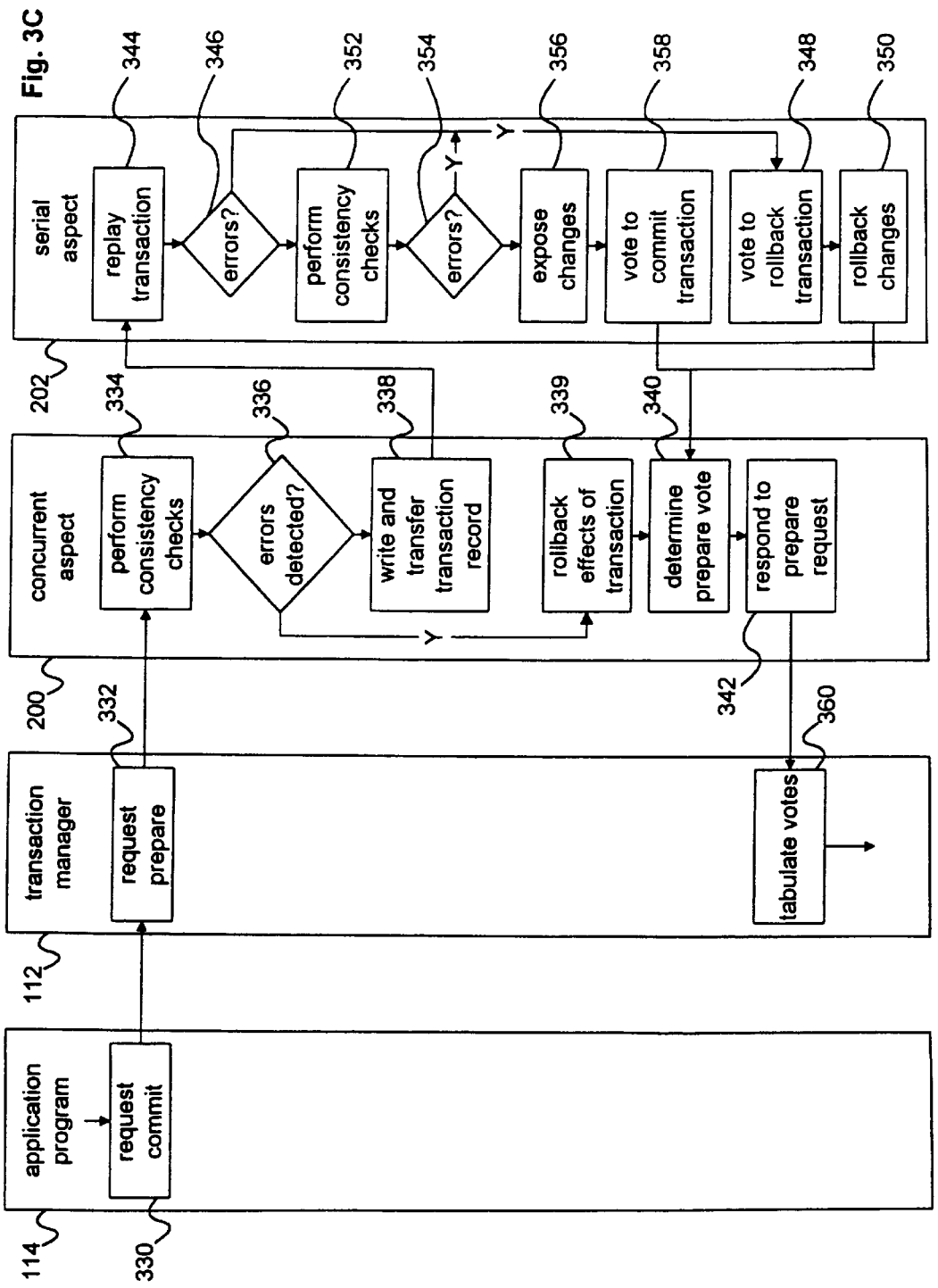
FIG. 3C is a flow chart showing the initial steps associated with a two-phase commit as used with an embodiment of the present invention.
Figure 3D:
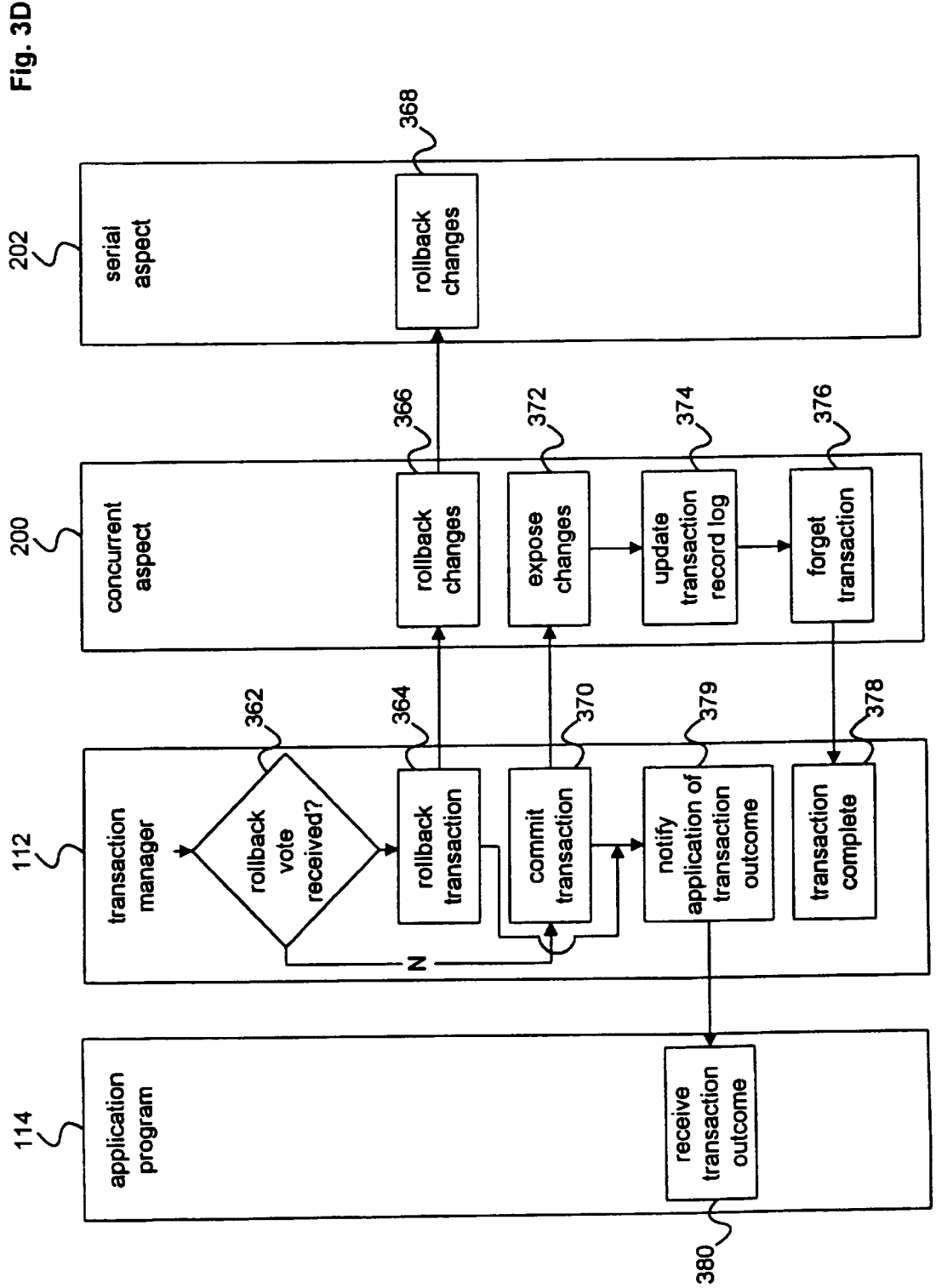
FIG. 3D is a flow chart showing the final steps associated with a two-phase commit as used with an embodiment of the present invention.

In FIG. 3B, the concurrent aspect 200 registers with the transaction manager 112 (step 314 through 320) and then performs requested work (steps 322 and 324). For the purposes of the present invention these two tasks are logically independent. Therefore, steps 314 though 320 may occur before, after or concurrently with steps 322 and 324. Additionally, it will generally be the case that the steps shown in FIG. 3B may be repeated one or more times during a single transaction. This allows the application program 114 to manipulate the protected resource 206 to an arbitrary degree. In these cases, it is not necessary for the concurrent aspect 200 to repeatedly register with the transaction manager 112. Therefore, steps 314 through 320 are only executed in response to the first message sent by the application program 114 to the concurrent aspect 200. It should also be appreciated that any number of resource managers 116 and any number of protected resources 206 may be involved a single transaction. Thus, the steps shown in FIG. 3B may be repeated separately for separate instances of the concurrent aspect 200 as part of a single transaction.

Furthermore, work request 310 may be performed by a concurrent aspect 200 or other resource manager on behalf of application 114, as well as directly by the application 114. In step 326, the concurrent aspect 200 returns the result of the request sent by the application program 114 in step 310. This result is received by the application program 114 in step 328.

In FIGS. 3A and 3B, application program 114 has first initiated a transaction and then manipulated protected resources 206. The next phase in a typical transaction scenario begins with step 330 of FIG. 3C where application program 114 sends a message to the transaction manager 112 requesting that the transaction be committed. In step 332, this message is received by the transaction manager 112. The transaction manager 112 processes the request by sending a prepare message to each resource manager that has registered as participating in the current transaction. In the case of process-pair resource manager 116, this message is received by concurrent aspect 200 in step 334.

Figure 5:
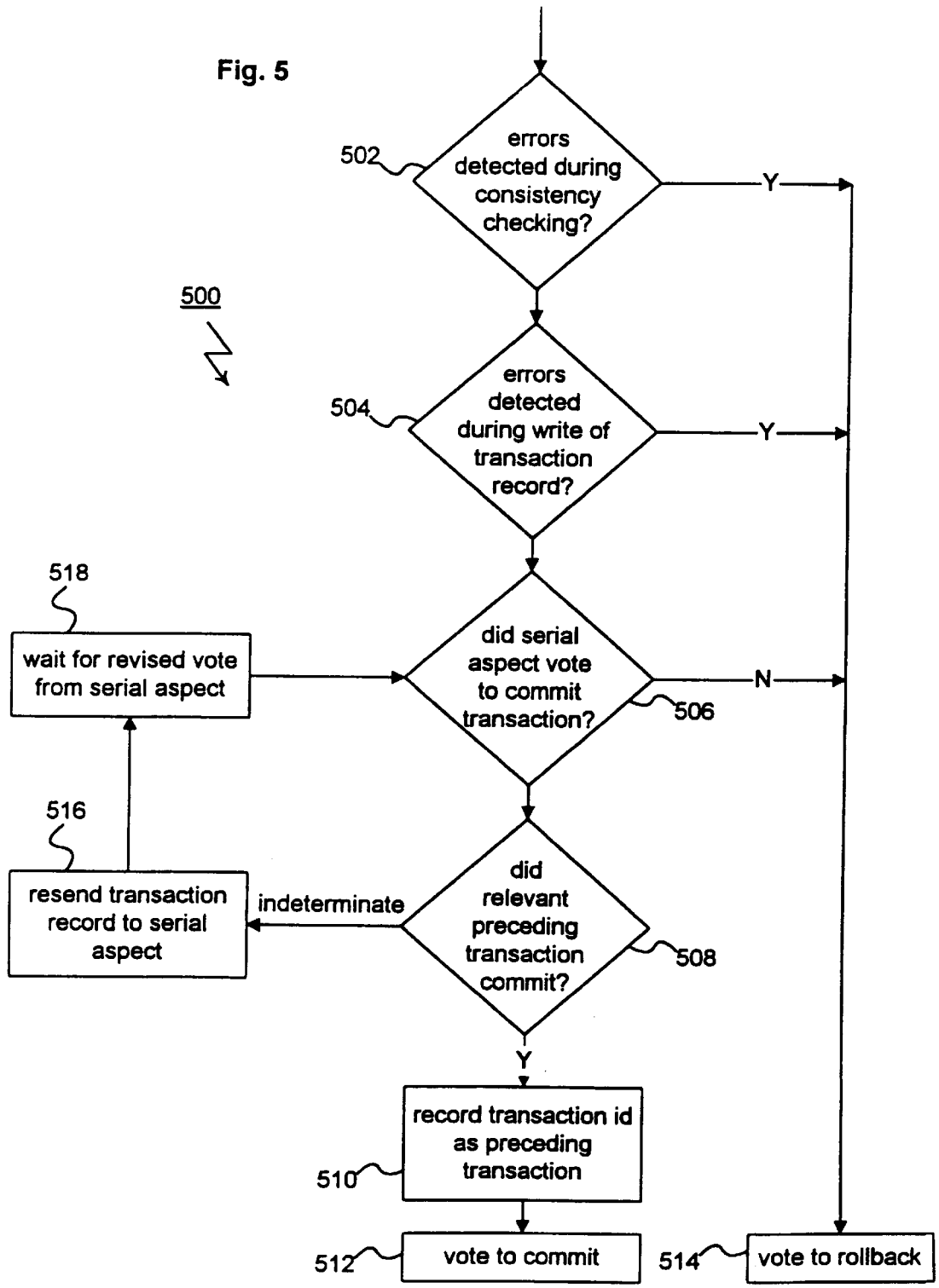
FIG. 5 is a flow chart showing the steps performed by the concurrent aspect to determine whether to vote to commit or roll back a transaction.

In response to the prepare message, the concurrent aspect 200 evaluates any application-specified or resource-manager-specified integrity constraints that are required for the current transaction. In step 336, the integrity constraints are examined by the concurrent aspect 200 for errors or exceptions. If errors or exceptions are found, the concurrent aspect 200 continues execution at step 339 where the concurrent aspect 200 performs the processing required to rollback the current transaction. This processing is described in more detail in later sections of this document. After performing the rollback processing of step 339, the concurrent aspect 200 determines in step 340, that it must respond "rollback" to "prepare" request 332; this response is then sent to the transaction manager 112 in step 342. Step 340 is illustrated by FIG. 5, and described in more detail later in this document.

The alternative to step 339 begins with step 338. Step 338 is reached; therefore, when the concurrent aspect 200 determines that no errors or exceptions have occurred in the evaluation of the integrity constraints. In this case, the concurrent aspect 200 adds the transaction record 212 to the transaction record log 214. For the purposes of the present invention, it is assumed that the addition of the transaction record 212 to the transaction record log 214 is verified. In other words, the preferred embodiment of the present invention requires that the concurrent aspect 200 be notified of the success or failure of the addition of the transaction record 212 to the transaction record log 214. Typically, this type of verification may be provided by encapsulating the transaction record log 214 in a record log manager. The record log manager sends a message to the concurrent aspect 200 indicating the success or failure of the addition of the transaction record 212. As the transaction record 212 is being added to the transaction record log 214, the concurrent aspect 200 transfers a copy of the transaction record 212 to the serial aspect 202.

In step 344, the serial aspect 202 receives the copy of the transaction record 212. Receipt of the transaction record 212 acts as an implicit prepare message to the serial aspect 202. As a result, in step 344, the serial aspect 202 uses the copy of the transaction record 212 to replay, or forward-play, the transaction. More specifically, the serial aspect 202 processes, in order, each message described in the copy of the transaction record 212. This processing is done by calling, in order, exactly the same methods of the object-like interface of concurrent aspect 200 as were called during step "perform work" 322, and passing exactly the same parameters. This is possible because the information needed to do so (method identification and parameter values) was recorded in transaction record 212 when the work for the request was originally performed. Any result or "out" parameters returned by the method invocation are compared to the corresponding results and "out" parameters recorded in transaction record 212; it is an error if this comparison yields a mismatch. After this comparison, the result and "out" parameters are discarded; they are not "returned" anywhere. Transaction record 212 may also contain, in-between the method invocation and response information for each method invoked by or on behalf of an application, records of invocations and responses made by the concurrent aspect 200 on behalf of the application in the course of step "perform work" 322. These also occur in the transaction record 212 in the order in which they were originally performed. During step "replay transaction" 344, serial aspect 202 is expected to attempt to make an exactly corresponding attempt to invoke the same external resource manager. When such a call is attempted by the serial aspect 202, it is intercepted, and compared to the next information in transaction record 212. If a mismatch occurs, this is an error, which is taken into account in step 346; otherwise this information is discarded. If such a record of an external call is found in the transaction record 212 at any point during the replay than when the replay is attempting to make the exactly corresponding call, this is also an error taken into account in step 346. Finally, no external call to the identified external resource manager is actually made during the replay process. Instead, the response and/or "out" parameter values, if any, which were returned to the concurrent aspect 200 when it made the corresponding external call during step "perform work" 322, are read from the transaction record 212 and returned as the result and/or "out" parameters of the call which the serial aspect 202 is attempting to make.

In step 346, the serial aspect 202 determines if any errors have been detected during the replay of the current transaction. If errors have occurred, the serial aspect 202 continues execution at step 348 where the serial aspect 202 sends a message to concurrent aspect 200 voting to rollback the transaction, then to step 350 where the changes made to the protected resource copy 208 are rolled back. More specifically, in step 350, the serial aspect 202 must undo any changes made to the protected resource copy 208 during the current transaction (i.e., the transaction originally initiated by the application program 114 in steps 302 through 308). The serial aspect 202 may do this rollback by aborting and restarting itself using the passivated image 210 and transaction record log 214, thereby restoring the serial aspect 202, and the protected resource copy 208, to the pre-transaction state. (This process is described in more detail later in this document.) Alternatively, in-memory rollback may be performed by erasing all of the state of protected resource copy 208, then reconstructing the pre-transaction state from the passivated serial aspect 202 and transaction record log 214. Either of these alternatives will ensure that no artifacts of the rolled-back transaction remain in protected resource copy 208.

If no errors are detected in step 346 the serial aspect 202 continues execution at step 352. In step 352, the serial aspect 202 evaluates any integrity constraints that are specified for the current transaction. In step 354, the serial aspect 202 determines if any errors or exceptions have occurred during the evaluation of the integrity constraints. If errors or exceptions are found, the serial aspect 202 continues execution at steps 348 and 350. In these steps, as discussed previously, the serial aspect 202 returns protected resource copy 208 to its pre-transaction state after sending a message to the concurrent aspect 200 voting to rollback the current transaction.

Step 356 is reached when the serial aspect 202 determines that no errors have occurred during the replay of the current transaction and where no errors or exceptions have been detected in the evaluation of the integrity constraints. In step 356, the serial aspect 202 exposes the changes that have been made during the current transaction to the protected resource copy 208. It should be appreciated that exposure of these changes does not violate the ACID properties via premature exposure of the transaction's changes because the forward play of the current transaction has been performed serially. For transaction processing systems, serialization is equivalent to isolation. Furthermore, the serial aspect 202 communicates only with the current aspect 200 and its memory is protected (by definition of a process) from being viewed directly by other processes. Typically, serial aspect 202 exposes these changes by removing any locks or other protections that have been applied to prevent access to the protected resource copy 208 by other process threads during the current transaction. (This is trivial, since there are no other process threads.) After exposing the changes to the protected resource copy 208 the serial aspect 202 sends, in step 358, a message to the concurrent aspect 200. The message indicates that the serial aspect 202 has voted to commit the current transaction.

Based on the preceding description it may be appreciated that the serial aspect 202 sends either a commit vote (in step 358) or an rollback vote (in step 348) for each transaction in response to each prepare message. These votes are received by the concurrent aspect 200 at step 340 where the concurrent aspect 200 determines whether to vote "commit" or "rollback" in response to step "request prepare" 332. This determination process is described in more detail later in this document. The concurrent aspect 200 then sends, in step 342, a message to the transaction manager 112. The message indicates that the concurrent aspect 200 has voted to commit or rollback the current transaction, as determined previously in step 340.

In step 360, the transaction manager 112 receives the vote of each resource manager participating in the current transaction. In step 362, (now referring to FIG. 3D) the transaction manger 112 determines if any participating resource manager has voted to rollback the current transaction. If one or more participating transaction managers vote to rollback, execution continues at step 364. In step 364 the transaction manager 112 sends a message to the concurrent aspect 200 (and to all other resource managers registered for the transaction) indicating that the current transaction should be rolled back. In step 366 this message is received by the concurrent aspect 200 which reacts by undoing the changes that have been made to the protected resource 206 (either by undoing the changes in memory or by aborting and restarting using the passivated serial image 210 and transaction record log 214), unless this was done previously in step 339. In step 366, the concurrent aspect 200 also forwards the rollback message to the serial aspect 202. In step 368, the rollback message is received by the serial aspect 202; the serial aspect 202 then aborts and restarts using the passivated image 210 and transaction record log 214. In this way, the changes made to the copy of the protected resource 208 are returned to the pre-transaction state. In step 379, transaction manager 112 sends a message to application program 114 notifying it that the transaction has been rolled back rather than committed.

If all transaction managers vote to commit the current transaction, execution continues at step 370. In step 370 the transaction manager 112 sends a message to the concurrent aspect 200 (and to all other resource managers registered for the transaction) indicating that the current transaction should commit. The transaction manager 112 then continues to step 379, where the transaction manager 112 sends a message to application 114 indicating that the transaction has committed. In step 372 the concurrent aspect 200 responds by exposing the changes that have been made to the protected resource 206. Typically, concurrent aspect 200 exposes these changes by removing any locks or other protections that have been applied to prevent access to the protected resource 206 during the current transaction by process threads not involved in the transaction.

In step 374, the concurrent aspect 200 updates the transaction record log 214 to indicate that the current transaction has committed. More specifically, for the purposes of the present invention, a unique identifier is associated with each transaction. Typically, this identifier is generated by the transaction manager 112 in response to a message sent by the application program 114 to initiate a transaction (see FIG. 3A). In step 374 this identifier is added to the transaction record log 214 with a flag indicating the transaction has committed. In this way, the transaction record log 214 is updated to positively identify each transaction that has been committed. As shown in the figures, this update of the transaction record log 214 occurs as part of the commit processing performed by the concurrent aspect 200. It may be appreciated, however, that it may be preferable to delay the update until the next time at which a transaction record 212 is added to the transaction record log 214. In this way, the update is "piggybacked" onto the next transaction record write by the concurrent aspect 200 in step 338 of a subsequent transaction. Typically, this "piggybacked" write would only be done if such a subsequent transaction record write was necessary within a relatively short time; otherwise, a separate write would be performed.

In step 376, the concurrent aspect 200 follows the update of the transaction record log 214 by sending a forget transaction message to the transaction manager 112. In step 378, the transaction manager 112 receives the forget transaction message and performs whatever processing is required to mark the current transaction as complete. (In particular, when all voting resource managers have sent such a "forget" message, the transaction manager may record this in durable storage and purge all record of the transaction from its working storage.)

As mentioned previously, the concurrent aspect 200 performs commit or rollback processing in step 339. A method for rollback processing in the concurrent aspect 200 is shown in FIG. 4 and generally designated 400. Method 400 begins with step 402 where the concurrent aspect 200 determines whether the changes made to protected resource 206 during the transaction may be completely undone in process memory without disrupting other transactions in progress, if any. This determination will depend on the implementation of the concurrent aspect 200 of this resource manager 116, which may vary according to the state being managed, how (and if) changes to the state are explicitly tracked, how isolation of uncommitted transaction changes is accomplished, and whether the concurrent aspect 200 has been written to support this "undo" operation. Note that it is equally correct for the concurrent aspect 200 to rollback changes either by tracking and undoing changes (steps 404 and 406) or by performing abort/recovery (steps 408 and 410). The difference is that abort/recovery may be resource-intensive, thus degrading the overall system's performance, and also forces the rollback of any other transactions which the concurrent aspect 200 is involved in, which may not be desirable for some applications. If step 402 determines that changes may be undone in memory without disrupting other transactions in progress, this undoing is performed in step 404, followed by step 406, which releases any intra-process locks held by the transaction.

If step 402 determines that changes may not be undone in the process' memory without disrupting other transactions, processing continues with step 408, where the concurrent aspect 200 sends a "rollback only" message to the transaction manager 112 for every other transaction it is involved with other than the current one (these messages are necessary because the changes associated with the other transactions will be lost in the following step 410). Processing then continues with step 410, where the concurrent aspect 200 performs abort/recovery, which is described in detail later in this document.

As previously discussed, the concurrent aspect 200 makes a determination in step 340 to vote either "commit" or "rollback." A method for making this determination is shown in FIG. 5 and generally designated 500. Method 500 begins with step 502 where the concurrent aspect 200 determines whether any errors were detected during consistency checking (step 334) (this may be implemented by simply recording in step 334 whether any errors were found, then reading that recorded value in step 502). If there were errors, processing continues with step 514, where the vote is set to "rollback."

As previously discussed, the transaction record 212 is appended to transaction record log 214 in step 338. The process of adding the transaction record 212 to the transaction record log 214 is typically performed by a record log manager. Step 504 ensures that the transfer operation initiated in step 342 has completed. If step 504 determines that errors have occurred during the transfer of the transaction record 212 to the transaction record log 214, execution of method 500 continues at step 514 where the concurrent aspect 200 votes to rollback the current transaction.

Alternatively, if the transfer of the transaction record 212 has completed without error, execution of method 500 continues with step 506. In step 506, the concurrent aspect 200 consults the response received in step 340. If the serial aspect 202 has voted to commit, processing continues with step 508; otherwise the vote of the concurrent aspect 200 must be to rollback and processing continues with step 514.

In step 508 the concurrent aspect 200 determines if the relevant preceding transaction has committed. If step 508 returns "indeterminate", this means that the immediately preceding transaction has rolled back. In the indeterminate case, however, it cannot be determined if the roll back of the immediately preceding transaction should cause the current transaction to roll back. This result arises because the replay in the serial aspect 202 may, or may not, have been dependent on the effects of that previous transaction. In particular, the effects of the immediately preceding transaction were present and exposed in the serial aspect 202, but might not have been used in the current transaction. To resolve this, the concurrent aspect 200 continues execution at step 516, where the concurrent aspect 200 re-sends the transaction record 212 to the serial aspect 202, which has by now gone through abort/recovery, thereby erasing all effects of the rolled-back transaction. The serial aspect 202 re-performs steps 344–358 of FIG. 3C, thus determining and responding with a potentially different vote. The concurrent aspect 200 waits in step 518 for the serial aspect 202 to respond with its vote, with the new vote guaranteed not to be affected by the rolled-back transaction. Subsequently, the concurrent aspect 200 resumes processing at step 506, where the concurrent aspect 200 takes into account this new vote from the serial aspect 202.

If step 508 returns "yes," method 500 continues execution with step 510, where the concurrent aspect 200 records the identity of the current transaction as the "preceding transaction id" for use during processing of the next transaction, if any. Execution then continues with step 512, where the concurrent aspect 200 votes to "commit."

Figure 6:
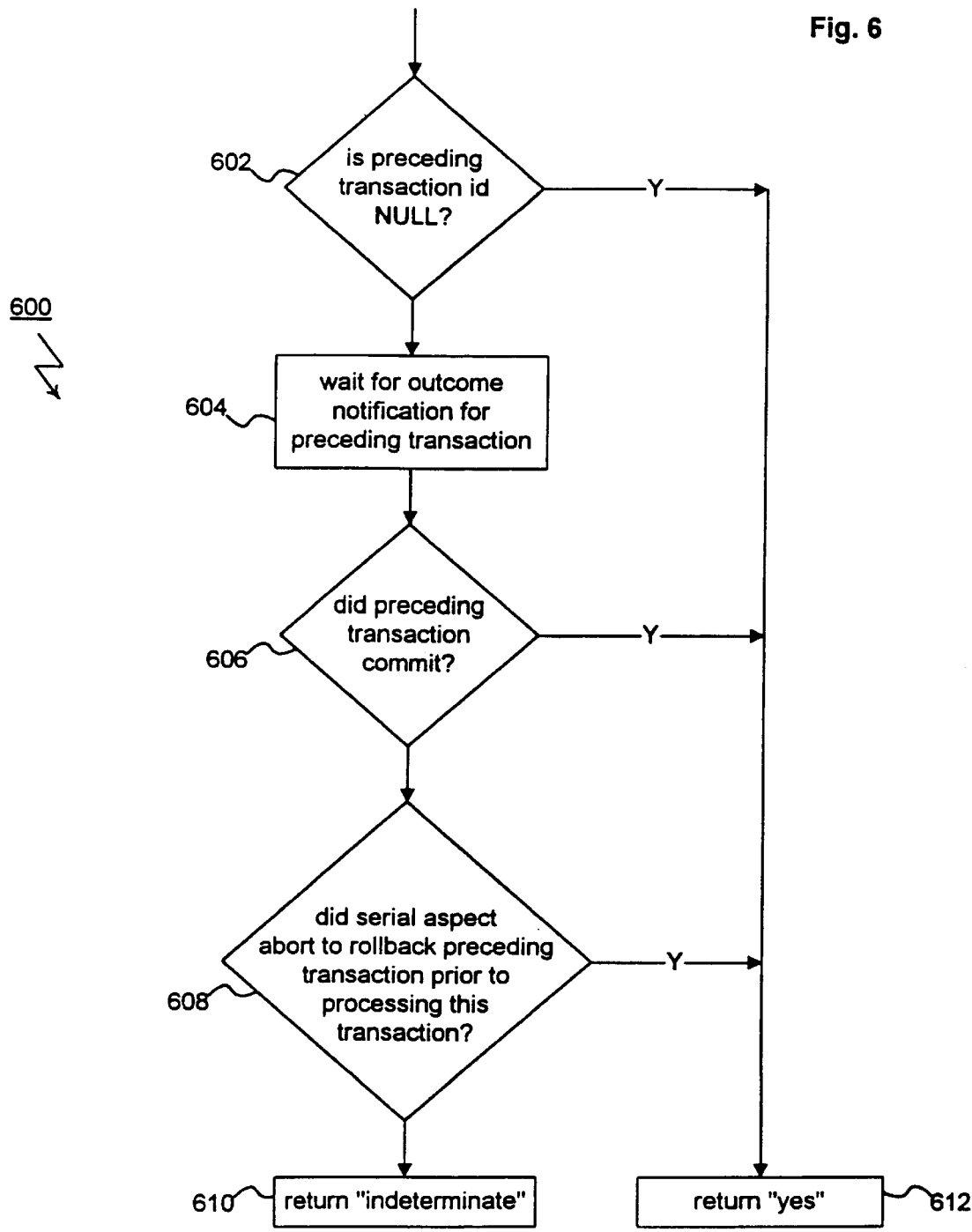
FIG. 6 is a flow chart showing the steps performed by the concurrent aspect to determine if an immediately preceding transaction has commited.

A method for determining whether the relevant preceding transaction has committed is shown in FIG. 6 and generally designated 600. Method 600 is the detailed description of step 508 in FIG. 5. Method 600 begins with step 602 where the concurrent aspect 200 tests whether the "preceding transaction id" is NULL. Note that NULL is the initial value of this variable when the concurrent aspect 200 is initialized/recovered, and this value is never assigned to it again. Hence, a value of NULL means there was no immediately preceding transaction during the current instantiation of the concurrent aspect 200. The lack of an immediately preceding transaction means, in turn, that either this is the first time this concurrent aspect 200 has run, and that there is therefore no relevant preceding transaction, or that the preceding transaction was rolled back such that it forced the concurrent aspect 200 to perform abort/recovery. In every such latter case the serial aspect 202 is also forced to perform abort/recovery processing. Thus a value of NULL means that there is no relevant preceding transaction (because the serial aspect 202 went through recovery immediately before processing the current transaction), so that only committed transactions were present in protected resource copy 208. Thus, if step 602 answers "yes", processing continues with step 612, where the response "yes" is returned from method 600.

If step 602 answers "no," processing continues with step 604, where concurrent aspect 200 waits for the outcome notification for the preceding transaction, which will be received in step 366 or 372 of the processing of the preceding transaction. It should be appreciated that processing of multiple transactions can be in progress in separate processing threads of the various processes involved in the present invention, which is why the current transaction may have reached step 604 (in method 600, called by step 508 of method 500, implementing step 340 in FIG. 3C) before the preceding transaction has reached step 366 or 372. When outcome notification for the preceding transaction is received (which may actually happen before processing of the current transaction reaches step 604), method 600 continues with step 606, which uses the now-known outcome of the preceding transaction. If the preceding transaction committed, processing continues with step 612, otherwise with step 608. In step 608 the concurrent aspect 200 sends a message to the serial aspect 202 to determine whether it had already performed abort/recovery to rollback the preceding transaction at the time it processed the current transaction. If it had, step 608 yields "yes", and processing continues with step 612 (previously described); otherwise processing continues with step 610. In step 610 the concurrent aspect 200 returns "indeterminate" as the result of method 600.

Figure 7:
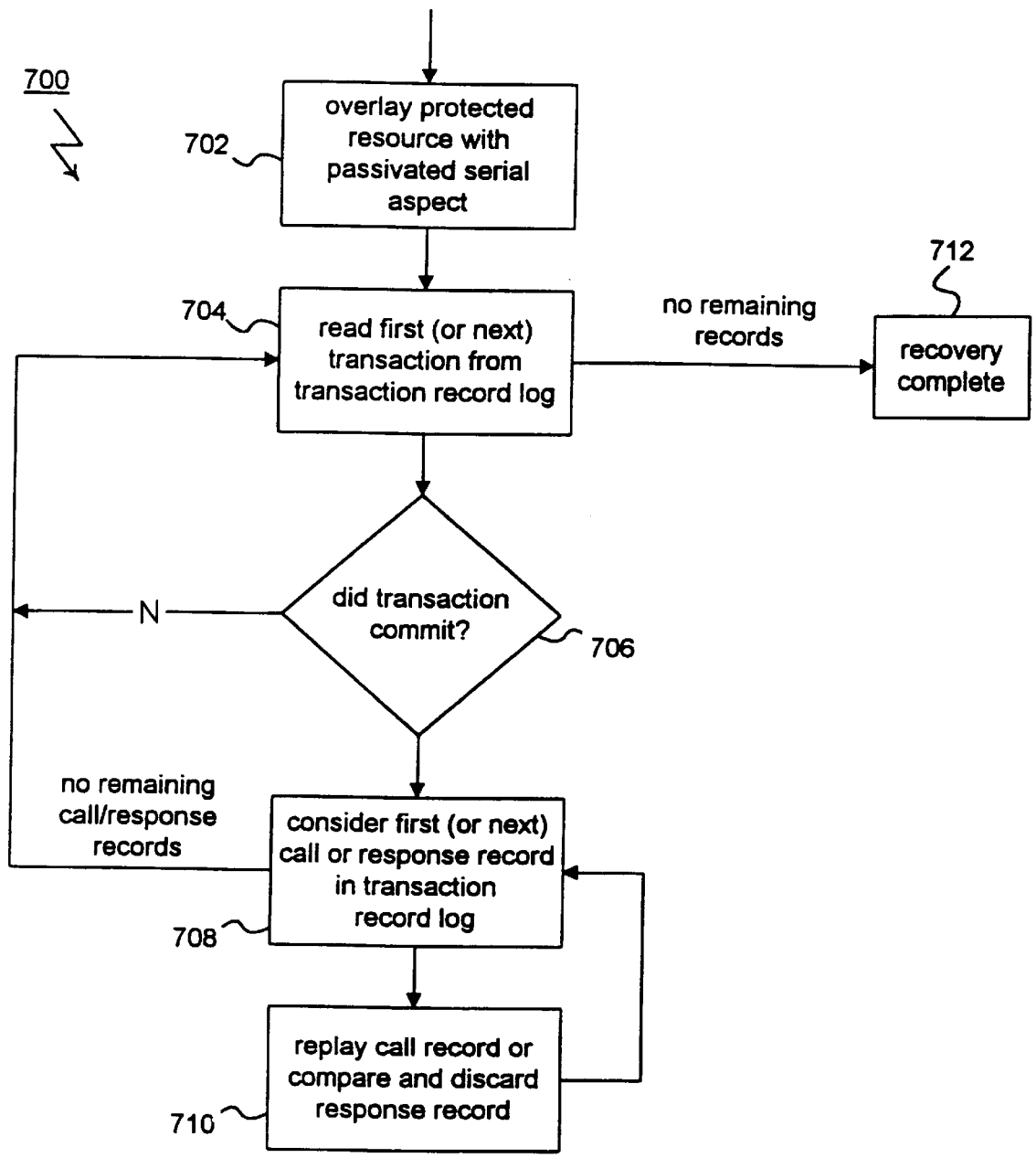
FIG. 7 is a flow chart showing the steps performed by the present invention to recover the concurrent or serial aspects using the passivated serial aspect and the transaction record log.

As indicated above, either concurrent aspect 200 or serial aspect 202 may be restarted and recovered using the passivated serial image 210 and transaction record log 214. A method for performing this recovery is shown in FIG. 7 and generally designated 700. To perform this type of recovery, the process to be recovered first overlays protected resource 206 or 208 (for the concurrent aspect 200 or serial aspect 202, respectively) with the state image previously saved on durable storage designated passivated serial aspect 210. This memory represents the state of the protected resource 208 at some previous between-transaction point, with the effects of all transactions which committed prior to the point correctly reflected in the protected resource 208. Hence, this overlay process returns the protected resource 206 or 208 to exactly that between-transaction state. This process of performing this overlay is represented in FIG. 7 as step 702.

Method 700 then continues with step 704, where the new process reads, in sequence, (having started at the beginning) the next transaction record 212 from transaction record log 214. If there are no transaction records 212 remaining then recovery is complete, otherwise processing continues with step 706. Step 706 determines whether the outcome of the transaction represented by the just-read transaction record 212 was "commit" or "rollback." The new process does this by one of three methods, tried in order as follows. First, the outcome may be recorded as the next item in the transaction record log 214 (a read-ahead of the log is required to determine this). Second, the outcome may be recorded immediately after the next transaction record log 214. (Again, read-ahead is required to determine this.) If neither of these is the case, then the transaction is still in "phase 2" of two-phase commit, which means that the outcome has been decided but the transaction manager 112 has not confirmed that all participating resource managers have received and recorded the outcome. In this case, the transaction manager 112 is consulted to determine the outcome of the transaction. If the outcome was "rollback", processing continues by returning to step 704. If the outcome was "commit" processing continues with step 708.

In step 708 the new process considers the next record of a call or response performed to or from resource manager 116 during the original processing of the transaction. If the record is a call, that call is reenacted—the same method is invoked within the process, providing exactly the same parameters as in the original call (the execution of this call will be discussed in more detail below). If the record is a response (which may include "out" parameters), the result and "out" parameters, if any, are compared to the corresponding result and "out" parameters recorded in the transaction record 212; they will always match exactly.

During the reenacting execution of a call in step 710, it may occur that the program instructions attempt to make an external call, e.g. invoke a method of a separate resource manager. Instead of actually performing this external call, step 710 will compare which call is being made, and what parameters are being passed, to the corresponding record in the transaction record 212. If they do not match exactly, this is a system error. Then, this call identification and outgoing parameters are discarded, and the response and "out" parameters, if any, which were returned by the corresponding external call during the original processing of the transaction by the concurrent aspect 200 are read from the transaction record 212, and used as though they were returned from the external call which the reenacting execution was trying to make.

From time to time, a process-pair resource manager may consolidate the passivated serial aspect 210 with transaction record log 214, as will be described below. Generally, this would be done to reduce the volume of durable storage required by these two components, and to reduce the amount of time which the recovery process described as method 700 would take.

It is essential that passivated serial aspect 210 and transaction record log 214 always be a matched set. That is, steps must be taken to ensure that one of these components is not modified by consolidation without the other having the complementary modification applied. To ensure this, the non-consolidated versions of the components are left intact during the modification process. Then, when the consolidated copies are complete, the identity of the currently active matched set of components 210 and 214 is changed, with transaction protection, to be the consolidated rather than the pre-consolidated components. (This identity may be kept by a traditional resource manager, e.g. a database system, to provide ACID properties to the identity switch.) The pre-consolidation components may then be removed.

Consolidation of the passivated serial aspect 210 and transaction record log 214 is done as follows. First, the serial aspect 202 must be in a between-transaction state. So, processing of any transaction which it is currently working on is completed, and processing of the next request from the concurrent aspect 200 to replay a transaction is forced to wait until the consolidation process is complete. Furthermore, the serial aspect 202 sends a message to the concurrent aspect 200 to confirm that the transaction commits; the concurrent aspect 200 does not reply until it has received notification from the transaction manager. If the outcome is that the transaction was rolled back, then the consolidation process is aborted, leaving components 210 and 214 unchanged. Assuming that the last transaction processed by the serial aspect 202 has committed, protected resource copy 208 correctly represents all committed transactions, and has no artifacts within it of any transaction which has not committed. The state of protected resource copy 208 is then written to durable storage as the consolidated passivated serial aspect 210. Since this consolidated component 210 represents all committed transactions, the matching consolidated transaction record log 214 is empty, so an empty transaction record log 214 is created on durable storage. Then, as previously described, the consolidated components become the active components, the old components are removed, and the serial aspect 202 resumes processing of transactions.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A resource manager for use in a computer system, the resource manager comprising:
    a concurrent aspect configured to provide access to a transaction protected resource during one or more concurrent transactions, the concurrent aspect configured to construct a transaction record for each respective transaction, each transaction record including each request message received by the concurrent aspect and each response message sent by the concurrent aspect during a particular transaction; and
    a serial aspect configured to serially replay the transactions in which the concurrent aspect participates, the serial aspect configured to cause a particular transaction to rollback if the replay of that transaction does not match the transaction record constructed by the concurrent aspect for that transaction.

2. A resource manager as recited in claim 1 wherein the concurrent aspect is configured to interact with transaction managers as part of a two-phase commit protocol.

3. A resource manager as recited in claim 2 further comprising a transaction record log and wherein the concurrent aspect is configured to respond to a prepare message received from a transaction manager by adding the transaction record corresponding to the prepare message to the transaction record log.

4. A resource manager as recited in claim 2 wherein the concurrent aspect is configured to respond to a prepare message received from a transaction manager by forwarding the transaction record corresponding to the prepare message to the serial aspect, receipt of the transaction record acting as an implicit prepare message to the serial aspect.

5. A resource manager as recited in claim 1 further comprising a passivated serial image, the passivated serial image including information usable to reconstruct the serial image in a between-transaction state.

6. A method for providing access to a transaction protected resource, the method comprising the steps, performed by a computer system, of constructing, by a concurrent aspect, one or more transaction records, each transaction record corresponding to a particular transaction, each transaction record including each request message received by the concurrent transaction during the transaction corresponding to that transaction record, each transaction record also including each response message sent by the concurrent aspect during the transaction corresponding to that transaction record; replaying in sequence, by a serial aspect, the transactions that correspond to the transaction records constructed by the concurrent aspect; and causing, by the serial aspect, a transaction to rollback if the replay of that transaction does not match the transaction record constructed by the concurrent aspect for that transaction.

7. A method as recited in claim 6 further comprising the step, performed by the concurrent aspect, of registering with a transaction manager.

8. A method as recited in claim 7 further comprising the steps, performed by the concurrent aspect, of: receiving a prepare message from a transaction manager, the prepare message corresponding to a particular transaction; and adding the transaction record corresponding to the particular transaction to a transaction record log.

9. A method as recited in claim 7 further comprising the steps, performed by the concurrent aspect, of: receiving a prepare message from a transaction manager, the prepare message corresponding to a particular transaction; and forwarding the transaction record corresponding to the particular transaction to the serial aspect, receipt of the transaction record acting as an implicit prepare message to the serial aspect.

10. A method as recited in claim 7 further comprising the step, performed by the serial aspect, of constructing a passivated serial image, the passivated serial image including information usable to reconstruct the serial image in a between-transaction state.

11. A computer program product comprising:
    a computer usable medium having computer readable code embodied therein for providing a resource manager for use in a computer system, the computer program product comprising:
        a concurrent aspect including computer readable program code devices configured to cause a computer to provide access to a transaction protected resource during one or more concurrent transactions, the concurrent aspect also including computer readable program code devices configured to cause a computer to construct a transaction record for each respective transaction, each transaction record including each request message received by the concurrent aspect and each response message sent by the concurrent aspect during a particular transaction; and a serial aspect including computer readable program code devices configured to cause a computer to serially replay the transactions in which the concurrent aspect participates, the serial aspect also including computer readable program code devices configured to cause a computer to rollback a transaction if the replay of that transaction does not match the transaction record constructed by the concurrent aspect for that transaction.

12. A computer program product as recited in claim 11 wherein the concurrent aspect includes computer readable program code devices configured to cause a computer to register the concurrent aspect with transaction managers as part of a two-phase commit protocol.

13. A computer program product as recited in claim 12 wherein the concurrent aspect includes computer readable program code devices configured to cause a computer to: receive a prepare message from a transaction manager, the prepare message corresponding to a particular transaction; and add the transaction record corresponding to the particular transaction to a transaction record log.

14. A computer program product as recited in claim 12 wherein the concurrent aspect includes computer readable program code devices configured to cause a computer to: receive a prepare message from a transaction manager, the prepare message corresponding to a particular transaction; and forward the transaction record corresponding to the particular transaction to the serial aspect, receipt of the transaction record acting as an implicit prepare message to the serial aspect.

15. A computer program product as recited in claim 12 wherein the serial aspect includes computer readable program code devices configured to cause a computer to construct a passivated serial image, the passivated serial image including information usable to reconstruct the serial image in a between-transaction state.

* * * * *

UNITED STATES PATENT AND TRADEMARK OFFICE
CERTIFICATE OF CORRECTION

PATENT NO. 6,105,147

DATED: August 15, 2000

INVENTOR(S) Mark E. Molloy

It is certified that an error appears in the above-identified patent and that said Letters Patent is hereby corrected as shown below:

The following three U.S. patents were submitted as prior art references in and IDS filed on October 1, 1999, but were omitted from the front page of the patent. They are now part of section 56.

| Number    | Issue Date | Name       | Class   |
|-----------|------------|------------|---------|
| 5,701,480 | 12/23/97   | Raz        | 395/671 |
| 5,765,176 | 06/09/98   | Bloomberg  | 707/514 |
| 5,835,764 | 10/10/98   | Platt, et al | 395/671 |

Signed and Sealed this

Twenty-second Day of May, 2001

*Attest:*

NICHOLAS P. GODICI

*Attesting Officer*   Acting Director of the United States Patent and Trademark Office